United States Patent [19]

Tokui

[11] Patent Number: 4,670,774

[45] Date of Patent: Jun. 2, 1987

[54] VIDEO FORMAT SIGNAL GENERATOR WITH IMPROVED SYNCHRONIZATION SYSTEM

[75] Inventor: Satoru Tokui, Tokyo, Japan

[73] Assignee: Pioneer Electronic Corporation, Tokyo, Japan

[21] Appl. No.: 609,750

[22] Filed: May 14, 1984

[30] Foreign Application Priority Data

May 18, 1983 [JP] Japan ................................ 58-086763

[51] Int. Cl.[4] ................................ H04N 9/455

[52] U.S. Cl. ................................ 358/19; 358/149

[58] Field of Search ................................ 358/19, 149

[56] References Cited

U.S. PATENT DOCUMENTS 4,249,198 2/1981 Ito ................................ 358/19

4,346,407 8/1982 Baer ................................ 358/149

4,450,480 5/1984 Cierva ................................ 358/149

4,554,582 11/1985 Wine ................................ 358/149

*Primary Examiner*—Michael A. Masinick

*Attorney, Agent, or Firm*—Fleit, Jacobson, Cohn & Price

[57] ABSTRACT

A video format signal generator based on a CRT controller, for producing a composite video format signal to be applied to a CRT display unit, is provided with improved circuit means for generating a clock signal to control the CRT controller whereby the timing relationships of the components of the output video format signal from the signal generator are accurately synchronized with a horizontal sync signal derived from an externally applied video signal when operating in an externally synchronized mode, whereby distortion of patterns displayed on the CRT arising from incorrect synchronization are eliminated.

6 Claims, 8 Drawing Figures

VIDEO FORMAT SIGNAL GENERATOR WITH IMPROVED SYNCHRONIZATION SYSTEM

BACKGROUND OF THE INVENTION

The present invention relates to a video format signal generator for producing a composite video format signal to be applied to a CRT display unit. Such a video format signal generator is based on a CRT controller, together with control means (such as a CPU) data memory means, video memory means etc, whose functions may be provided by a personal computer for example. Such a video format signal generator can in general be controlled to selectively operate in an externally synchronized mode and an internally synchronized mode. In the externally synchronized mode, a composite video signal supplied from some external source (this being referred to in the following simply as an external video signal) is input to a sync separator circuit whereby vertical and horizontal sync pulse signals (referred to in the following simply as V and H sync signals) are derived from the external video signal. These V and H sync signals are applied to the CRT controller, to respectively reset a horizontal counter circuit and a vertical counter circuit, which control the timing relationships of components of the composite video format signal from the CRT controller. More specifically, the counter period of the vertical counter circuit controlled by the V sync signal in this way determines the vertcial scanning period of the output video signal from the CRT controller, while the count period of the horizontal counter circuit, controlled by the H sync signal, serves to determine the horizontal scanning period of the output video signal. The counting operations of these counter circuits are controlled by a clock signal of fixed frequency. Generally speaking, the period of this clock signal corresponds to the width of a picture element of the CRT display, i.e. the width of the minimum size of dot element which can be displayed. In the prior art, this clock signal for operation of the horizontal counter circuit is generated independently of the H sync signal derived from the external video signal, i.e. the clock signal is not synchronized with this clock signal. As a result, if for example a vertical line comprising a set of vertically stacked dot elements is displayed on the CRT, the lack of synchronization between the clock signal controlling the horizontal counter circuit in the CRT controller and the H sync signal (which determines the horizontal scanning period) will result in a successively staggered condition of the vertically stacked dots on the display, resulting in a type of fringed effect appearing on vertical lines. This is a very undesirable effect, which is unavoidable with prior art types of video format signal generator having a relatively simple circuit configuration.

There is therefore a requirement for circuit means, preferably simple and economical to implement, whereby the clock signal described above can be accurately synchronized with the H sync signal derived from an external video signal, to eliminate the objectionable display effect described above.

SUMMARY OF THE INVENTION

It is an objective of the present invention to overcome the disadvantage of prior art types of video format signal generator described above, resulting from improper synchronization of the clock signal controlling the CRT controller operation. With a video format signal generator according to the present invention, when operating in an externally synchronized mode with an external video signal being applied, V sync signal and H sync signal are derived from the external video signal by a sync separator circuit, and the H sync signal is applied to a clock signal generating circuit which produces a clock signal whose frequency is an integral multiple of that of the H sync signal, and which is locked precisely in phase with the H sync signal. Such a clock signal generating circuit can comprise a simple phase lock loop. The clock signal thus produced is applied to control the operation of the horizontal counter circuit in the CRT controller, whereby the operation of that counter circuit is synchronized with the H sync signal which is applied as a reset signal to the counter. In this way, the disadvantage of the prior art described above, arising from lack of accurate synchronization, is effectively eliminated.

Furthermore, with a video format signal generator according to the present invention, when operating in an internally synchronized mode in which the horizontal counter circuit and vertical counter circuit of the CRT controller are reset by signals generated within the CRT controller itself, a signal derived from frequency division of a quartz crystal oscillator circuit output signal is applied to the clock signal generating circuit, whose output clock signal thereby becomes locked in phase to the quartz crystal oscillator circuit output signal. In addition, subcarrier synchronization circuit means are provided which operate in conjunction with this quartz crystal oscillator circuit whereby, when operating in the externally synchronized mode with an external video signal applied, the color burst component of the external video signal is extracted and the frequency of oscillation of the quartz crystal oscillator circuit is locked in phase with this color burst signal component. In this way, the quartz crystal oscillator circuit serves as a color subcarrier signal, which can be applied to a color encoder circuit together with color information signals from the CRT controller to thereby produce signals to drive a color video display. It thereby becomes possible to easily combine color display information from the external video signal and color display information synthesized by the CRT controller together on the CRT display, since the timing relationships of the components of the external video signal and of the output video signal from the CRT controller are identical.

BRIEF DESCRIPTION OF THE DRAWINGS

FIG. 5 shows how

DESCRIPTION OF THE PREFERRED EMBODIMENTS

Figure 1:
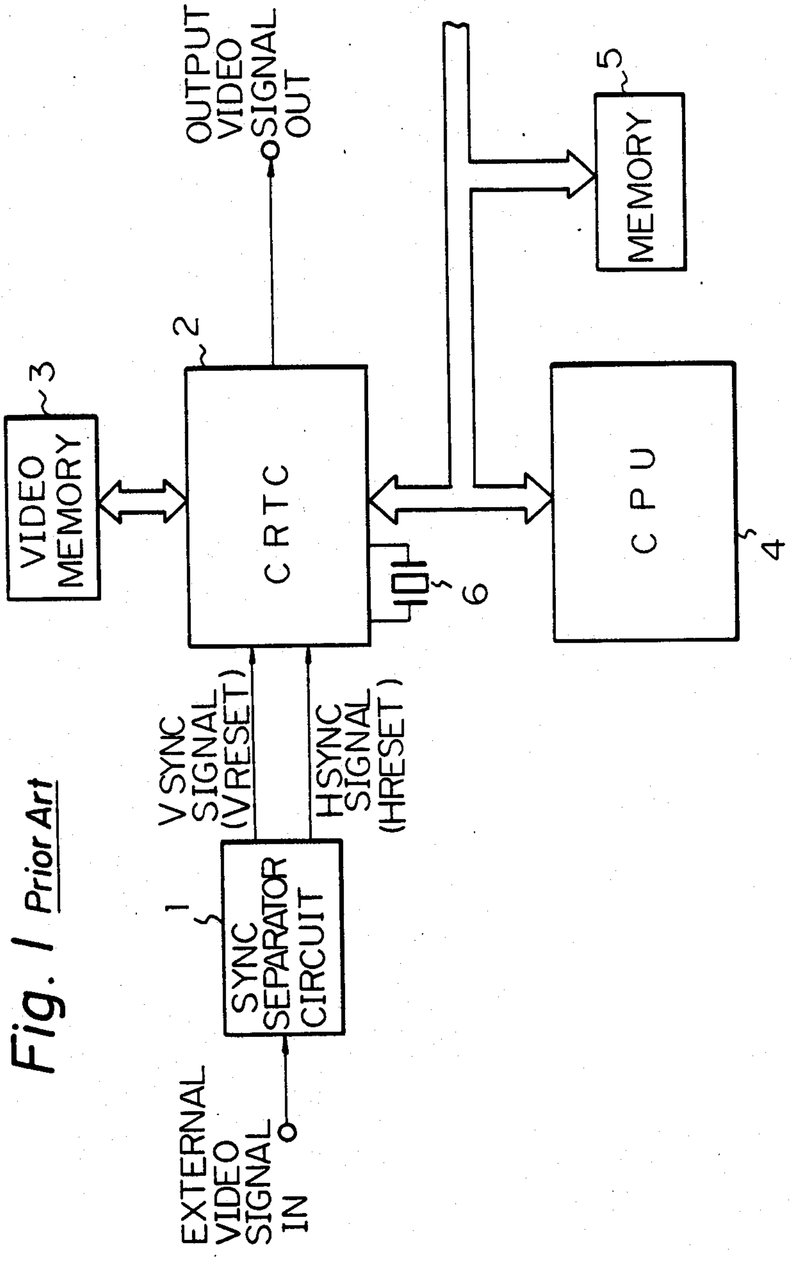
Fig. 1 Prior Art
FIG. 1 is a block diagram of an example of a prior are type of video format signal generator.

Before describing an embodiment of the present invention, the disadvantages of prior art video format signal generators will be described, with reference to the drawings. FIG. 1 shows an example of a prior art video format signal generator. A video signal produced from some external source is applied to a sync separator circuit 1, and a vertical sync signal (hereinafter referred to as a V sync signal) and a horizontal sync signal (hereinafter referred to as an H sync signal) are thereby derived. This V sync signal and H sync signal are applied to a CRT controller 2 (CRTC) which is connected to a video memory 3, a CPU (central processing unit) 4, and to a memory circuit 5, by means of a data bus, address bus, control bus, etc. Based on data stored in video memory 3, CRT controller 2 is controlled by signals applied from CPU 4 to generate a composite video format signal which is applied to a CRT (not shown in the drawings). CRT controller 2 operates from a clock signal which is generated by a quartz crystal oscillator circuit whose frequency of oscillation is controlled by a quartz crystal vibrator 6 and a video format signal is generated therefrom which is synchronized with this clock signal. Vertical and horizontal counter circuits (not shown in the drawing) are provided within CRT controller 2. When the video format signal generator operates in an externally synchronized mode, these counter circuits are respectively reset by the V sync signal and H sync signal from sync separator circuit 1 in FIG. 1. The vertical scanning period of the output video signal from CRT controller 2 is determined by the count period of the vertical counter circuit, controlled by the V sync signal in this way, while the horizontal scanning period is determined by the count period of the horizontal counter circuit, controlled by the H sync signal. Data stored in memory 3 is output in the form of a component of the video format signal from CRT controller 2 which is synchronized with the clock signal generated by the quartz crystal oscillator circuit.

The quartz crystal oscillator circuit coupled to quartz crystal vibrator 6 can be provided internally within CRT controller 2, or can be an externally connected circuit.

Since CRT controller 2 reads out and writes in the data stored in video memory 3 on the basis of the clock signal generated by the quartz crystal oscillator circuit, and since the operation of this quartz crystal oscillator circuit is not synchronized with the H sync signal, there will be some degree of phase difference between the clock signal and the timing of the start of each horizontal scanning line on the CRT display. This is due to the fact that counter reset is performed by the V sync signal and H sync signal from sync separator circuit 1 as described above. Thus, stepwise fringing patterns will appear in the vertical direction on the CRT display as will now be described with reference to FIGS. 2(*a*) and 2(*b*), and FIGS. 3 and 4.

Figure 2:
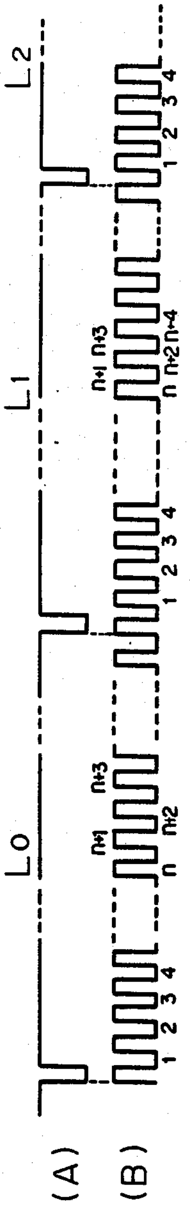
FIG. 2 to FIG. 4 are diagrams for illustrating a disadvantage of the prior art type of video format signal generator shown in FIG. 1, arising from lack of synchronization between an external video signal and a clock signal controlling the CRT controller.
Figure 3:
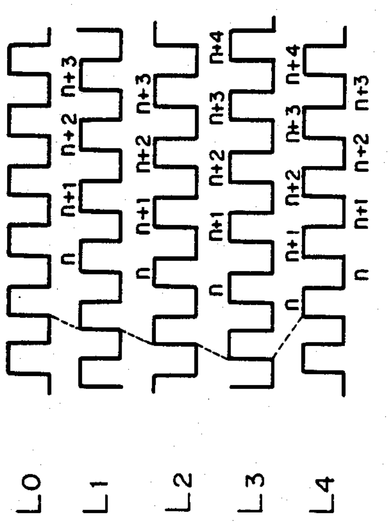
Figure 4:
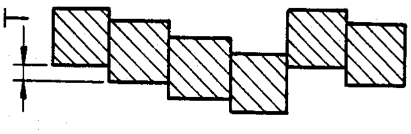

With regard to the phase relationship between the H sync signal shown in FIG. 2(*a*), i.e. the reset signal applied to a horizontal counter circuit in CRT controller 2, and the clock signal shown in FIG. 2(*b*), it can be understood by observing the rising and falling edges of the H sync signal that this phase relationship will differ between the first horizontal scanning line L1 and the second line L2, respectively. As a result, the waveforms of the clock signal during successive horizontal scanning intervals, will be as shown in FIG. 3, with the clock signal pulses occurring during the horizontal scanning intervals of successive horizontal scanning lines L0 to L4 being shown vertically superimposed. Count values, representing the number of falling edges of the H sync signal which are counted by the horizontal counter circuit in CRT controller 2, are indicated as n, n+1, . . . In this example it can be seen that the clock signal advances in phase by 90° for each successive horizontal scanning line. Thus, the phase in the fifth line L4 will correspond with that of the first line L0. The effect of this on an actual CRT display dot is illustrated in FIG. 4, in which a set of dots each corresponding to a picture element, which should be vertically stacked in line are shown. As can be seen, a stepwise fringing pattern, with successive dots being displaced laterally by an amount T will be produced, resulting from the phase difference of 90° described above.

One method of overcoming this problem is to make the period of the clock signal sufficiently short with respect to the time interval which corresponds to the picture element width, so that such fringing patterns can be ignored. However this is not practical, since the speed of operation of the CRT controller would become excessively low. Alternatively, it is possible to use a quartz crystal vibrator whose frequency is a precise integral multiple of the H sync signal frequency. However a specially selected quartz crystal vibrator for a specific exact frequency is difficult to manufacture, and would result in increased manufacturing cost. In any case, this would not be a completely satisfactory solution due to deviantions which will always occur to some extent in the frequency of an H sync signal derived from an external video signal input.

Figure 5A:
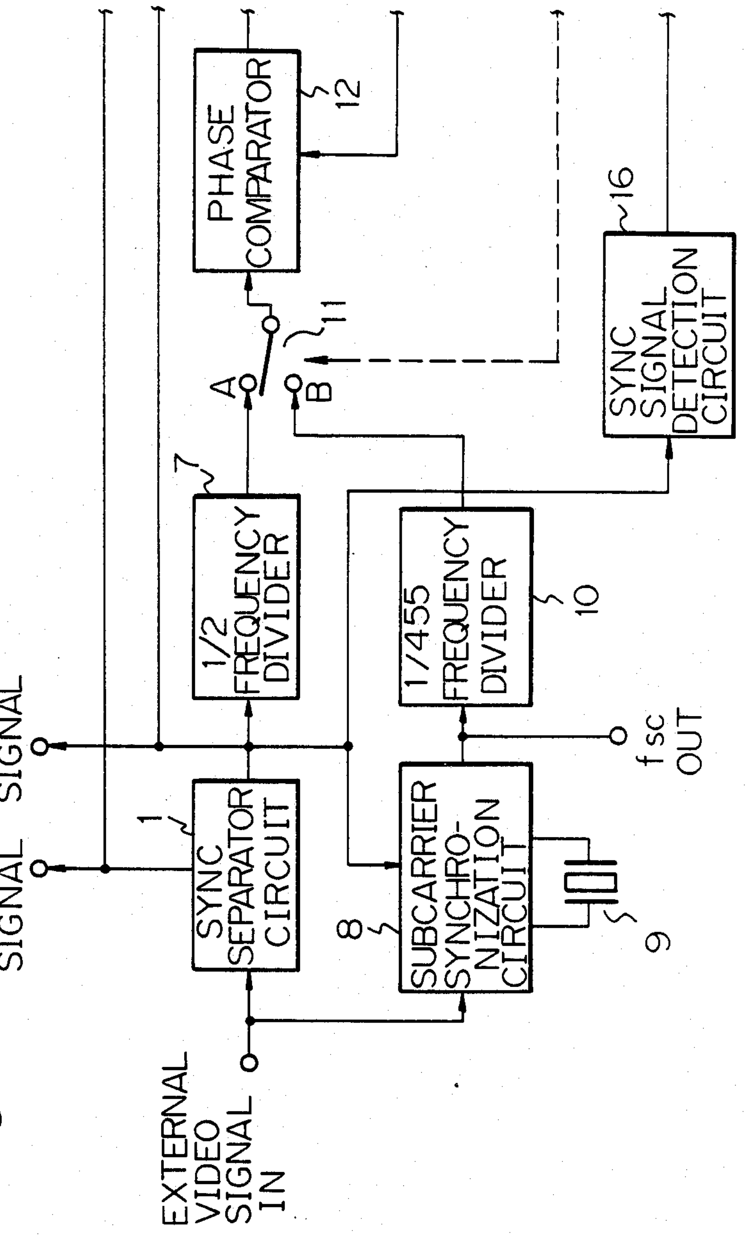
FIGS. 5A and 5B are combined and FIGS. 5A and 5B together show a block circuit diagram of an embodiment of a video format signal generator according to the present invention.
Figure 5B:
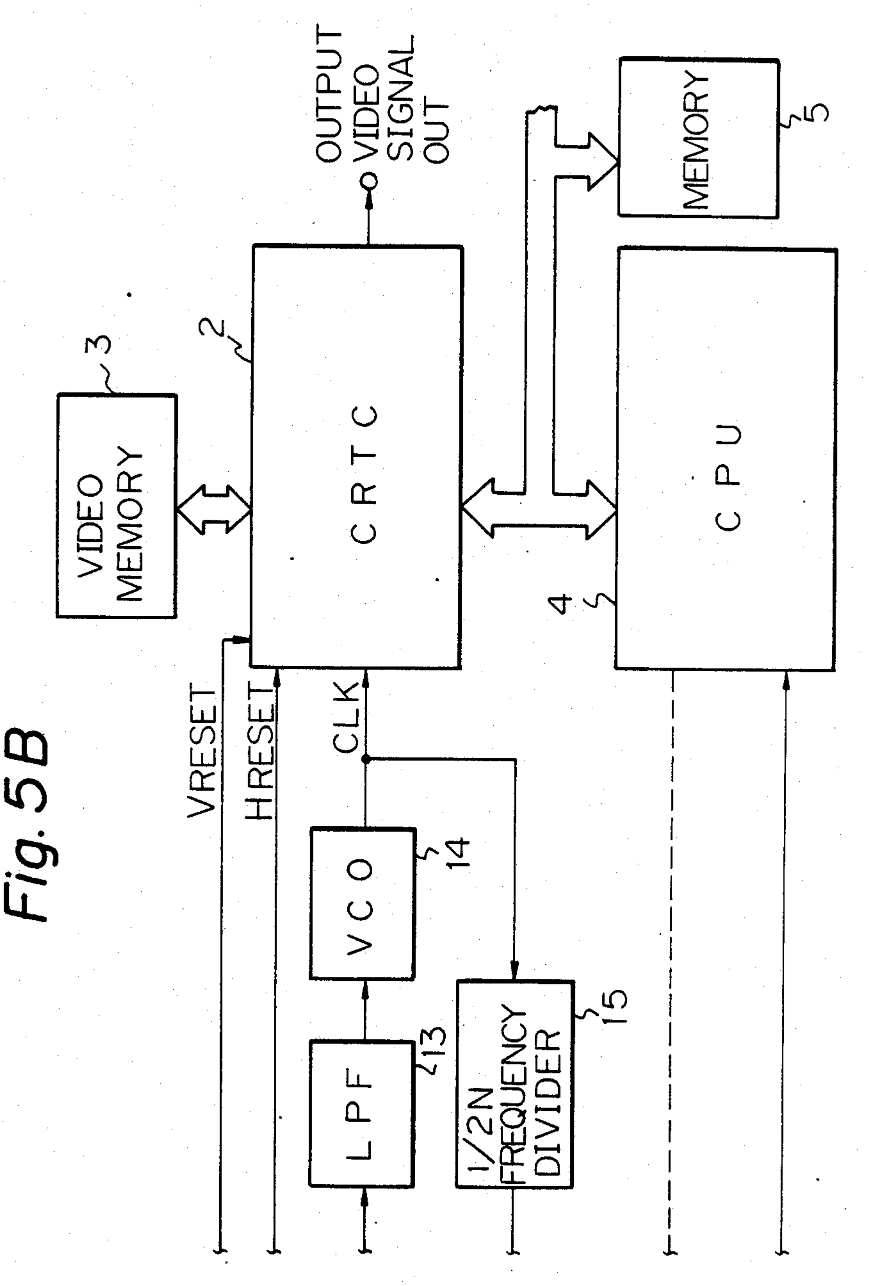

The present invention will now be described, referring first to FIGS. 5A and 5B which together constitute a block diagram of an embodiment of the present invention. FIGS. 5A and 5B are combined as shown in FIG. 5. Portions therein corresponding to portions in FIG. 1 are numbered identically to FIG. 1. In FIG. 5A, the external video signal is input to a sync separator circuit 1, to derive a V sync signal and an H sync signal. When the video format signal generator is operating in an externally synchronized mode, these are applied respectively to reset the horizontal and vertical counter circuits in CRT controller 2, shown in FIG. 5B, as described for the prior art example above. In addition, the H sync signal is input to a ½ frequency divider circuit 7 (FIG. 5A) and to a subcarrier synchronization circuit 8. Subcarrier synchronization circuit 8 serves to generate a signal having a free-running frequency of 3.58 MHz from an oscillator circuit whose frequency is controlled by a quartz crystal vibrator 9. This quartz crystal oscillator circuit has a circuit configuration such that the frequency of the output signal can be varied, within a restricted range, by a control voltage applied thereto.

The term "free-running frequency", although not generally applied to a quartz crystal oscillator circuit, is used herein to designate the frequency of oscillation of the quartz crystal oscillator circuit in the absence of an applied control signal, with this frequency being determined solely by the quartz crystal vibrator 9.

The subcarrier synchronization circuit further comprises circuit means for deriving a color burst signal component (referred to in the following simply as the color burst signal) from the external video signal and circuit means for synchronizing the free-running frequency of the quartz crystal oscillator circuit with this color burst signal, to thereby produce a subcarrier signal ($F_{sc}$). The subcarrier signal ($F_{sc}$) which is synchronized with the color burst signal in this way is input to a 1/455 frequency divider circuit. The frequency-divided output signals from frequency divider circuits 7 and 10 are respectively selected by a 2-input selector 11, which can comprise electronic switch means controllable by signals applied from CPU 4. The signal thus selected is input to a phase comparator circuit 12. The phase deviation output signal from phase comparator circuit 12 is applied through an LPF (low-pass filter) 13 (FIG. 5B) as a control voltage to a VCO (voltage controlled oscillator circuit) 14. The output signal from VCO 14 is applied to a ½N frequency divider circuit 15, and the output signal therefrom is applied as the second input to phase comparator circuit 12. It can thus be understood that the combination of phase comparator circuit 12, LPF 13 and VCO 14 with frequency divider circuit 15 constitute in combination a phase lock loop (PLL) circuit. Thus, the clock signal which is generated by VCO 14 is locked in phase with the selected signal which is output from selected 11. This clock signal controls the operation of CRT controller 2. The operation of selector 11 is controlled by command signals from CPU 4, on the basis of output signals from a sync signal detection circuit 16, which serves to detect the presence or absence of the H sync signal from sync separator circuit 1 (and hence the presence or absence of the external video signal). If it is adjudged by sync signal detection circuit 16 that the H sync signal is absent, then CPU 4 generates a command which designates that selector 11 is to be set to the B selection status shown in FIG. 5A, whereby the output from the 1/455 frequency divider circuit 10 becomes input to the PLL circuit. In this case, since the external video signal is not utilized, the 3.5 MHz free-running output signal from the oscillator circuit in subcarrier synchronization circuit 8 is transferred through frequency divider circuit 10, whose output becomes the reference signal for the PLL circuit.

The remaining portions of this embodiment are identical to the corresponding portion in the example of FIG. 1 above and so no further description will be given.

Figure 6:
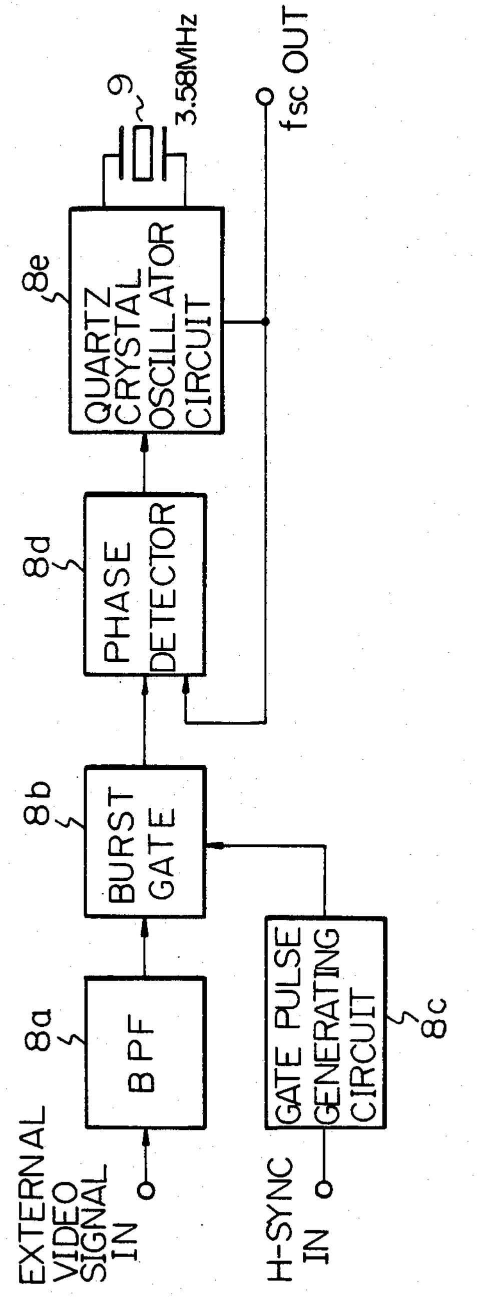
FIG. 6 is a block circuit diagram of a subcarrier synchronization circuit provided in the embodiment of FIG. 5.

FIG. 6 is a block diagram of a specific embodiment of subcarrier synchronization circuit 8 shown in FIG. 5, which utilizes APC (automatic phase control) operation. The external video signal input is applied to a BPF (band-pass filter) 8*a*, whereby the color burst signal frequency component of the external video signal is extracted. Since the chroma signal component has the same frequency as the color burst component, a burst gate 8*b* is used to gate through only the color burst component, utilizing burst gate pulses generated by a gate pulse generating circuit 8*c*, which receives the H sync signal as input. The color burst signal derived in this way applied to a phase detector 8*d*, in which it is compared with the phase of the output signal from quartz crystal oscillator circuit 8*e*. Oscillator circuit 8*e* is a voltage-controlled circuit, which is phase-controlled by the output signal from phase detector 8*d*, and which has a free-running frequency of 3.58 MHz, determined by a quartz crystal vibrator 9. In this way, a color subcarrier signal ($F_{sc}$) is output, which is locked in phase with the color burst signal. This color subcarrier signal is used to generate a color video signal, in conjunction with a color encoder as described hereinafter.

With the configuration described above, when the A side of selector 11 is designated, i.e. with the system operating in the externally synchronized mode, the H sync signal produced from sync separator circuit 1 is applied to ½ frequency divider circuit 7, whose output is applied to the input of the PLL circuit through selector 11. Thus, the clock signal for CRT controller 2 which is output from VCO 14 has a frequency which is N times that of the H sync signal (where N is an integer), and which is phase-locked with the H sync signal. Thus, since N clock signal pulses correspond to each horizontal scanning interval and hence to each horizontal scanning line on the CRT display, the fringing effect on the CRT display illustrated in FIG. 4 and described hereinabove will not be produced.

If on the other hand selector 11 is set to the B position, the CRT controller 2 will operate in the internally synchronized mode, in which internal synchronization commands are applied from CPU 4 to CRT controller 2, whereby reset signals for the horizontal counter circuit and vertical counter circuit in CRT controller 2 are generated internally.

With the system operating in the internally synchronized mode, the V and H sync signal reset signals produced by sync separator circuit 1 are ignored. In addition, the clock signal output from VCO 14 is locked to a frequency which is N/455 times the oscillation frequency of the quartz crystal vibrator 9 in subcarrier synchronization circuit 8. In this way the 3.58 MHz output signal whose frequency is set by quartz crystal vibrator 9 in subcarrier synchronization circuit 8 serves as the basic reference frequency signal for producing the clock signal, during operation in the internally synchronized mode. It can thus be understood that the clock signal generating circuit, comprising a PLL circuit, is effectively used to generate a clock signal for controlling the timing relationships of the components of the output composite video signal from CRT controller 2, both during internally synchronized mode and externally synchronized mode operation. As a result of these dual functions of the clock signal generating circuit, the overall circuit configuration can be simplified and manufacturing cost reduced.

If the system is operating in the externally synchronized mode with an external video signal applied, and if the external video signal should be interrupted for some reason, then the system will automatically switch to the internally synchronized mode of operation. Specifically, the external detection circuit 16 will detect the absence of the H sync signal from sync separator circuit 1, and will input a signal to CPU 4 to indicate this loss of the H sync signal. In response, CPU 4 will generate a command signal to selector 11 designating change-over to the B side selection status, so that operation enters the internally synchronized mode described above.

Figure 7:
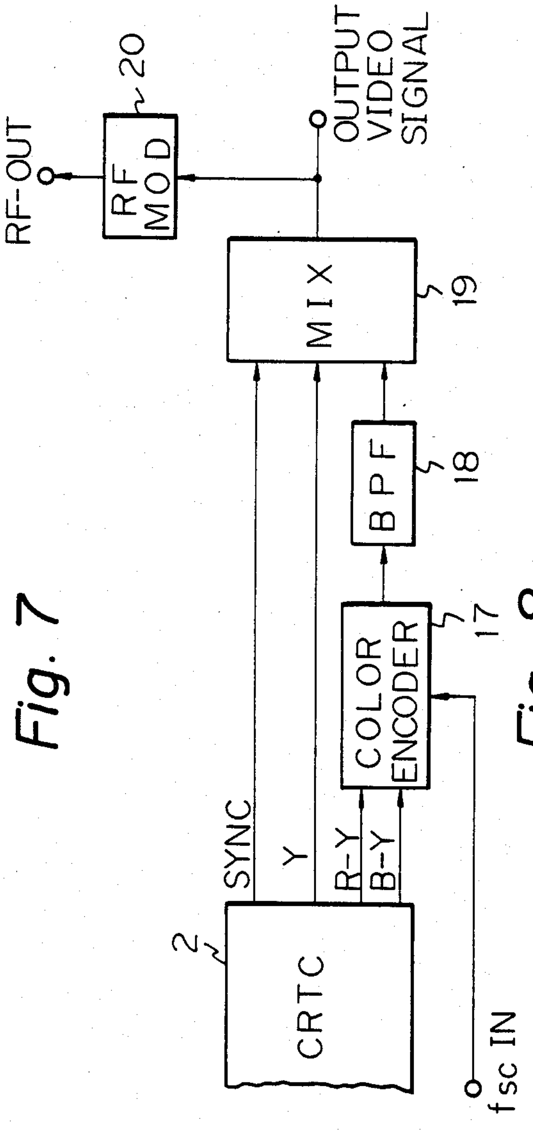
FIG. 7 is a block circuit diagram for illustrating a method of producing a color composite video format signal using the embodiment of FIGS. 5A and 5B.

FIG. 7 is a block diagram to illustrate the operation for the case in which the output of CRT controller 2 is used to generate a color composite video format signal. The color subcarrier signal ($F_{sc}$) produced by quartz crystal oscillator circuit 5 is input to a color encoder 17, and modulates the R-Y and B-Y chroma signals. The output signal from encoder 17 is transferred through a BPF 18 to a mixer circuit 19, and is mixed with the sync signal and brightness signal Y from CRT controller 2. In this way, a color video signal is produced and is converted to a radio frequency (RF) signal by a RF modulator 20. Thus, when CRT controller 2 operated in the externally synchronized mode, the external video signal is matched in phase to the color subcarrier compoennt of the composite video format signal which is synthesized by CRT controller 2. By adding a switching circuit to receive the output video signal from CRT controller 2 and the external video signal, it becomes possible to perform operations such as combining the synthesized composite video format signal with the external video signal, etc.

Figure 8:
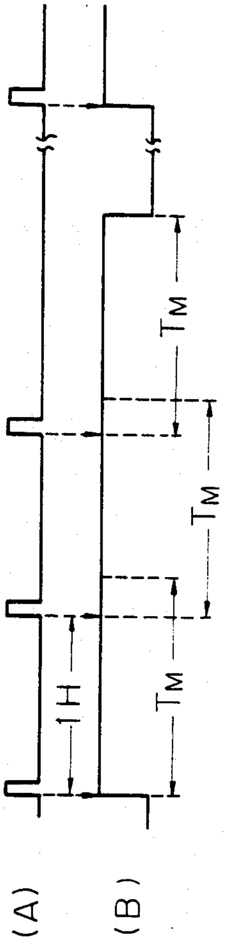
FIG. 8 is a timing diagram for illustrating the operation of a sync signal detection circuit in the embodiment of FIGS. 5A and 5B.

FIG. 8(*a*) and 8(*b*) are timing diagrams for illustrating the operation of sync signal detection circuit 16 in FIG. 5A for the case in which this circuit comprises a retriggerable MMV (monostable multivibrator).

If the pulse width $T_m$ of the output pulses from this MMV, shown in FIG. 8(*b*), is made somewhat longer than the period of 1H of the train of H sync pulses, shown in FIG. 8(*a*), than as shown in FIG. 8(*b*), the MMV will be continuously retriggered so that the output of the MMV will be held at the high level. If the H sync signal should disappear, the retriggering will not occur, so that the output of the MMV will go to the low level. In this way, the output signal level from the MMV provides a rapid indication of the presence or absence of the external video signal.

In the example of FIGS. 5A and 5B, the input signal to the PLL is either the output signal from the ½ frequency divider circuit 7 which receives the H sync signal as input, or the output from the 1/455 frequency divider circuit 10 which receives the subcarrier signal as input signal. The reason for this is that the H sync signal is related to the subcarrier signal by the equation $f_h=(2/455)\times f_{sc}$, where $f_h$ is the repetition frequency of the H sync signal and $f_{sc}$ is the frequency of the subcarrier signal. The division ratios, selected for the frequency divider circuits, thereby ensure that the video format signals output from the CRT controller have identical timing relationships both for the externally synchronized mode and for the internally synchronized mode. However, if there is some deviation in the frequency of the H sync signal, then the 1/455 frequency division ratio can be adjusted as necessary to compensate for this, using that frequency division ratio as a center value.

Instead of performing switchover of the input signal to phase comparator circuit 12 in accordance with the presence or absence of the external video signal (i.e. the decision being made by CPU 4 on the basis of the output signals from sync signal detection circuit 16), it can be arranged simply that selector 11 is set to the A side status if the external video signal is present, and is set to the B side status if the external video signal is absent, with this setting being implemented by hardware means.

The above embodiment has been described for the case of NTSC composite color video signals being generated. However, it should be noted that the present invention is applicable not only to NTSC video format signals, but also to other formats such as the PAL video format.

As desicrbed in the above, the present invention ensures accurate synchronization of the timing relationships of components of a composite video frequency sinal produced by a CRT controller with the corresponding components of an externally applied video signal from which a H sync signal and V sync signal are derived to control the operation of the CRT controller. Using a composite video format signal generator according to the present invention, excellent display quality can be attained when operating in the externally synchronized mode even if there is some deviation in the frequency of the H sync signal derived from the external video signal. Furthermore, operation both in the externally synchronized mode and in the internally synchronized mode is achieved using a single PLL circuit and a single quartz crystal oscillator circuit both to generate the clock signal for operation of the CRT controller and to generate a color subcarrier signal. Thus, the overall circuit configuration can be simple and such a system can be implemented at low manufacturing cost.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A video format signal generator for producing a video format signal synchronized with an externally applied video signal, comprising:

a CRT controller coupled to control circuit means and video memory circuit means, operable to generate a composite video format signal from data in said video memory circuit under the control of said control circuit means;

sync separator circuit means for separating sync signals from said externally applied video signal, said sync signals being applied to said CRT controller for controlling the timings of horizontal and vertical frame intervals in said composite video frequency signal; and clock signal generating circuit means coupled to receive said sync signals from said sync separator circuit means, for generating a clock signal comprising a pulse train of fixed frequency which is synchronized in phase with said sync signals;

said clock signal being applied to said CRT controller for controlling the operation thereof such that the timing relationships of components of said composite video format signal generated therefrom are synchronized with said sync signals from said sync separator circuit. means.

2. A video format signal generator according to claim 1, and further comprising:

subcarrier synchronization circuit means coupled to receive said externally applied video signal, for producing a subcarrier signal which is locked in phase with a color burst component of said externally applied video signal;

frequency divider circuit means for frequency dividing said subcarrier signal to produce a frequency divided subcarrier signal; and selector means operable to selectively apply, to said clock signal generating circuit means, said sync signal from said sync separator circuit means and said frequency divided output signal from said frequency divider circuit means.

3. A video format signal generator according to claim 2 in which said subcarrier synchronization circuit means comprise;

an oscillator circuit for generating an output signal of predetermined fixed frequency when operating in a free-running state in the absence of said externally applied video signal;

circuit means for separating a color burst component of said externally applied video signal; and circuit means for locking said oscillator circuit output signal in phase with said color burst component.

4. A video format signal generator according to claim 3, and further comprising;

sync signal detection means for detecting the presence of absence of said externally applied video signal as evidence by a presence or absence of said sync signals from said sync separator circuit means, and for producing output signals to respectively indicate said presence or absence;

control means responsive to said output signals from said sync signal detection means for setting said selector means to transfer said sync signal from said sync separator means to be input to said clock signal generating circuit means when said externally applied video signal is being applied, and for setting said selector means to transfer said frequency divided subcarrier signal to be input to said clock signal generating circuit means when said externally applied video signal is absent.

5. A video format signal generator according to claim 3, in which said oscillator circuit is controlled by a quartz crystal vibrator.

6. A video format signal generator according to claim 1, in which said clock signal generating circuit means comprise a phase lock loop.

* * * * *